(12) United States Patent
Furukawa et al.

(10) Patent No.: US 8,483,736 B2
(45) Date of Patent: *Jul. 9, 2013

(54) RADIO CHANNEL CONTROL METHOD AND RECEIVING APPARATUS

(75) Inventors: Hideto Furukawa, Kawasaki (JP); Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 136 days.

This patent is subject to a terminal disclaimer.

(21) Appl. No.: 12/976,400

(22) Filed: Dec. 22, 2010

(65) Prior Publication Data

US 2011/0092166 A1 Apr. 21, 2011

Related U.S. Application Data

(60) Division of application No. 11/730,671, filed on Apr. 3, 2007, now Pat. No. 7,881,740, which is a division of application No. 11/043,307, filed on Jan. 26, 2005, now Pat. No. 7,945,280, which is a continuation of application No. PCT/JP03/01881, filed on Feb. 20, 2003.

(51) Int. Cl.
*H04B 7/00* (2006.01)

(52) U.S. Cl.
USPC ......... 455/509; 455/69; 455/67.11; 455/423; 455/517; 370/310; 370/328; 370/329

(58) Field of Classification Search
USPC ............... 455/466, 403, 422.1, 445, 522, 69, 455/68, 550.1, 517, 426.1, 426.2, 67.11, 455/423–425, 73; 370/310, 328, 329, 343
See application file for complete search history.

(56) References Cited

U.S. PATENT DOCUMENTS

| | | |
|---|---|---|
| 4,811,421 A | 3/1989 | Havel |
| 6,131,035 A | 10/2000 | Ohkubo |
| 6,137,840 A | 10/2000 | Tiedemann, Jr. |
| 6,473,442 B1 | 10/2002 | Lundsjo |
| 6,519,278 B1 | 2/2003 | Hiramatsu |
| 6,671,266 B1 | 12/2003 | Moon et al. |
| 6,738,646 B2 | 5/2004 | Miyoshi |
| 6,904,290 B1 | 6/2005 | Palenius |
| 6,912,228 B1 | 6/2005 | Dahlman |
| 6,934,556 B2 | 8/2005 | Takano |

(Continued)

FOREIGN PATENT DOCUMENTS

| | | |
|---|---|---|
| CN | 1381114 A | 11/2002 |
| CN | 1386337 A | 12/2002 |

(Continued)

OTHER PUBLICATIONS

Notice of Allowance dated Aug. 8, 2011 received in U.S. Appl. No. 13/009,488.

(Continued)

*Primary Examiner* — Sujatha Sharma
(74) *Attorney, Agent, or Firm* — Smith, Gambrell & Russell, LLP

(57) ABSTRACT

A radio channel control method for controlling, in a radio communication system having a transmitter and a receiver, a radio channel from the transmitter toward the receiver. The method includes receiving a signal transmitted from the transmitter by the receiver, measuring reception quality of the signal, generating information which indicates increment or decrement of the reception quality, and controlling a modulation or coding for the radio channel based on the information.

1 Claim, 11 Drawing Sheets

U.S. PATENT DOCUMENTS

| | | |
|---|---|---|
| 6,963,752 B1 | 11/2005 | Nilsson |
| 7,126,965 B2 | 10/2006 | Sugisaki |
| 7,171,229 B2 | 1/2007 | Moulsley |
| 2002/0046379 A1 | 4/2002 | Miki |
| 2002/0106989 A1 | 8/2002 | Aizawa |
| 2002/0123349 A1 | 9/2002 | Miyoshi |
| 2002/0123351 A1 | 9/2002 | Miyoshi |
| 2002/0131449 A1 | 9/2002 | Sugisaki |
| 2002/0136271 A1 | 9/2002 | Hiramatsu |
| 2002/0142732 A1 | 10/2002 | Asano |
| 2002/0160721 A1 | 10/2002 | Kanemoto |
| 2003/0003905 A1 | 1/2003 | Shvodian |
| 2003/0092461 A1 | 5/2003 | Moulsley |
| 2004/0171387 A1 | 9/2004 | Miyoshi |
| 2004/0214593 A1 | 10/2004 | Shin |
| 2005/0208961 A1 | 9/2005 | Willenegger |
| 2006/0094460 A1 | 5/2006 | Tiedemann, Jr. |
| 2006/0205358 A1 | 9/2006 | Itoh et al. |

FOREIGN PATENT DOCUMENTS

| | | |
|---|---|---|
| EP | 1111815 A1 | 6/2001 |
| EP | 1204225 A1 | 5/2002 |
| EP | 1249951 A1 | 10/2002 |
| EP | 1113693 B1 | 3/2004 |
| EP | 1422898 A1 | 5/2004 |
| JP | 11088940 A | 3/1999 |
| JP | 2001016166 A | 1/2001 |
| JP | 2001025068 A | 1/2001 |
| JP | 2001238256 A | 8/2001 |
| JP | 2001268148 A | 9/2001 |
| JP | 2001285180 A | 10/2001 |
| JP | 2001333051 A | 11/2001 |
| JP | 2001339458 A | 12/2001 |
| JP | 2002009741 A | 1/2002 |
| JP | 2002026808 A | 1/2002 |
| JP | 2002084578 A | 3/2002 |
| JP | 2002101043 A | 4/2002 |
| JP | 2002199459 A | 7/2002 |
| JP | 2002271303 A | 9/2002 |
| JP | 2002290246 A | 10/2002 |
| WO | 02-52883 A1 | 7/2002 |

OTHER PUBLICATIONS

Notice of Allowance dated Aug. 9, 2011 received in U.S. Appl. No. 12/976,325.
Notice of Allowance dated Aug. 18, 2011 received in U.S. Appl. No. 13/011,527.
Notice of Allowance dated Aug. 25, 2011 received in U.S. Appl. No. 13/011,298.
Notice of Allowance dated Sep. 8, 2011 received in U.S. Appl. No. 11/730,670.
Notice of Allowance dated Dec. 1, 2010 received in U.S. Appl. No. 11/730,672.
Decision of Rejection dated Oct. 19, 2010 received in corresponding Japanese Patent Application No. 2008-000822.
Notice of Allowance dated Oct. 19, 2010 received in U.S. Appl. No. 11/730,671.
Notice of Allowance dated Oct. 21, 2010 received in U.S. Appl. No. 11/730,669.
Notice of Allowance dated Oct. 21, 2010 received in U.S. Appl. No. 11/730,670.
Patent Appeal Decision dated Jul. 27, 2010 received in corresponding Japanese Patent Application No. 2004-568488.
Notice of Allowance dated Sep. 2, 2010 received in U.S. Appl. No. 11/730,672.
Final Office Action dated May 18, 2010 received in U.S. Appl. No. 11/730,672.
Non-Final Office Action dated May 3, 2010 received in U.S. Appl. No. 11/730,669.
Non-Final Office Action dated May 3, 2010 received in U.S. Appl. No. 11/730,670.
Japanese Office Action dated Jun. 22, 2010 received in corresponding Japanese Patent Application No. 2008-000822.
Non-Final Office Action dated May 4, 2010 received in U.S. Appl. No. 11/730,671.
Non-Final Office Action dated Nov. 14, 2007 received in U.S. Appl. No. 11/730,671.
Non-Final Office Action dated Dec. 11, 2008 received in U.S. Appl. No. 11/730,671.
Final Office Action dated Jun. 3, 2008 received in U.S. Appl. No. 11/730,671.
Final Office Action dated Sep. 4, 2009 received in U.S. Appl. No. 11/730,671.
Non-Final Office Action dated Nov. 14, 2007 received in U.S. Appl. No. 11/730,672.
Final Office Action dated Jun. 2, 2008 received in U.S. Appl. No. 11/730,672.
Non-Final Office Action dated Dec. 8, 2008 received in U.S. Appl. No. 11/730,672.
Non-Final Office Action dated Sep. 4, 2009 received in U.S. Appl. No. 11/730,672.
Non-Final Office Action dated Nov. 14, 2007 received in U.S. Appl. No. 11/730,669.
Final Office Action dated Jul. 9, 2008 received in U.S. Appl. No. 11/730,669.
Non-Final Office Action dated Mar. 9, 2009 received in U.S. Appl. No. 11/730,669.
Final Office Action dated Oct. 19, 2009 received in U.S. Appl. No. 11/730,669.
Non-Final Office Action dated Nov. 14, 2007 received in U.S. Appl. No. 11/730,670.
Final Office Action dated Jul. 11, 2008 received in U.S. Appl. No. 11/730,670.
Non-Final Office Action dated Dec. 29, 2008 received in U.S. Appl. No. 11/730,670.
Final Office Action dated Oct. 1, 2009 received in U.S. Appl. No. 11/730,670.
Supplemental European Search Report received in EP01274838. 02415 dated Jul. 18, 2007.
Analysis of the Uplink of an Asynchronous Multi-user DMT OFDMA System Impaired by Time Offsets, Frequency Offsets, and Multi-path Fading Andrea M. Tonello, Nicola Laurenti, Silvan Pupolin DEI—Department of Electronics and Informatics—University of Padova Via Gradenigo 6/A—35 13 1 Padova—Italy tonelioQdei.unipd.it-nil@dei.unipd.it-pupolin@dei.unipd.it 2000.
Supplemental European Search Report dated Jan. 26, 2010 received in 03705365.9-1246/1542378 PCT/JP0301881.
Chinese First Notification of Office Action dated Nov. 30, 2007 received in Application No. 03819354.X.
Notice of Allowance dated Nov. 30, 2010 received in U.S. Appl. No. 11/043,307.
Non-Final Office Action dated Jul. 17, 2008 received in U.S. Appl. No. 11/043,307.
Non-Final Office Action dated Sep. 17, 2009 received in U.S. Appl. No. 11/043,307.
Final Office Action dated Feb. 4, 2009 received in U.S. Appl. No. 11/043,307.
Final Office Action dated Mar. 26, 2010 received in U.S. Appl. No. 11/043,307.
Extended European Search Report dated Jul. 12, 2011 received in application No. 11157228.5-1246 / 2333986.
Extended European Search Report dated Jul. 12, 2011 received in application No. 11157230.1-1246 / 2333987.
Extended European Search Report dated Jul. 12, 2011 received in application No. 11157231.9-1246 / 2333988.
Non-Final Office Action dated May 26, 2011, received in U.S. Appl. No. 12/976,325.
Non-Final Office Action dated May 25, 2011, received in U.S. Appl. No. 13/011,298.
Notice of Allowance dated Jun. 23, 2011, received in U.S. Appl. No. 11/730,670.
Notice of Allowance dated Sep. 20, 2011 received in U.S. Appl. No. 13/009,591.
Notice of Allowance dated Nov. 17, 2011 received in U.S. Appl. No. 12/976,325.
Notice of Allowance date Sep. 7, 2010 received in U.S. Appl. No. 11/043,307.

Advisory Action dated Jul. 14, 2009 received in U.S. Appl. No. 11/043,307.

Notice of Allowance dated Feb. 18, 2011 received in U.S. Appl. No. 11/730,669.

Notice of Allowance dated Mar. 2, 2011 received in U.S. Appl. No. 11/043,307.

International Search Report dated Jun. 3, 2003 received in PCT/JP03/01881.

Notice of Allowance dated Apr. 8, 2011 received in U.S. Appl. No. 13/011,527.

Notice of Allowance dated Aug. 9, 2012 received in U.S. Appl. No. 13/009,488.

Notice of Allowance dated Aug. 10, 2012 received in U.S. Appl. No. 13/009,591.

Non-final Office Action dated Apr. 12, 2013 received in U.S. Appl. No. 13/687,733.

FIG.3

| TRANSMISSION PARAMETER VALUE | TRANSMISSION PARAMETERS | |
|---|---|---|
| | MODULATION METHOD | CODING RATE |
| 0 | QPSK | 1/3 |
| 1 | QPSK | 1/2 |
| 2 | QPSK | 3/4 |
| 3 | 16QAM | 1/2 |
| 4 | 16QAM | 3/4 |

RADIO CHANNEL CONTROL METHOD AND RECEIVING APPARATUS

CROSS-REFERENCE TO RELATED APPLICATION

This application is a divisional of application Ser. No. 11/730,671, filed Apr. 3, 2007, which is a divisional of application Ser. No. 11/043,307, filed Jan. 26, 2005, which is a U.S. continuation application filed under 35 USC 111(a) claiming benefit under 35 USC 120 and 365(c) of PCT application JP03/01881, filed Feb. 20, 2003. The foregoing applications are hereby incorporated herein by reference in their entirety.

TECHNICAL FIELD

The present invention relates to a radio channel control method for, in a mobile communication system having a transmitting apparatus and a receiving apparatus, controlling a radio channel from the transmitting apparatus toward the receiving apparatus, and to the receiving apparatus for which the radio channel control method is applied.

BACKGROUND ART

In radio communication, in particular in a mobile communication, a radio channel set between communication apparatuses which carry out information transmission/reception is likely to fluctuate. In order to carry out information transmission using such a radio channel appropriately, transmission parameters of the radio channel is appropriately changed. The transmission parameters include, for example, a modulation method, a coding rate, a ratio of the number of true information bits with respect to the number of total transmission bits including redundancy bits such as error correction bits (referred to as a 'Rate-Matching ratio', hereinafter), or the number of spreading codes used in a CDMA (Code Division Multiple Access) communication.

FIG. 1 shows a configuration example in the prior art of a mobile communication system changing the transmission parameters of the radio channel. The mobile transmission system shown in the figure includes a base station 500 acting as a transmitting apparatus and a mobile station 600 acting as a receiving apparatus. Hereinafter, it is assumed that, as the transmission parameters, a coding rate and a modulation method are applied.

The base station 500 includes an encoder 502, a modulation part 504, a transmission part 506, a circulator 508, an antenna 510, a reception part 512, a demodulation part 514, a decoder 516 and a transmission parameter setting part 518. On the other hand, the mobile station 600 includes an antenna 602, a circulator 604, a reception part 606, a demodulation part 608, a decoder 610, a block error rate deriving part 612, a transmission parameter determination part 614, a transmission baseband part 616 and a transmission part 618.

Change of the transmission parameters of the radio channel from the base station 500 toward the mobile station 600 (referred to as a 'downlink radio channel', hereinafter) is carried out in the following procedure. That is, based on the coding rate used as the transmission parameter notified of by the transmission parameter setting part 518, the encoder 502 of the base station 500 encodes input data to be transmitted, and outputs it to the modulation part 504. Based on the modulation method notified of by the transmission parameter setting part 518, the modulation part 504 modulates a baseband signal with the data encoded (referred to as 'encoded data', hereafter), and outputs it as a signal to be transmitted to the transmission part 506. The transmission part 506 transmits the signal modulated by the encoded data, to the mobile station 600, via the circulator 508 and the antenna 510.

The reception part 606 in the mobile station 600 receives the signal from the base station 500 via the antenna 602 and the circulator 604, and outputs it to the demodulation part 608. The demodulation part 608 applies the modulation method corresponding to the modulation method applied by the modulation part 504 of the base station 500, demodulates the input signal, and outputs the encoded data to the decoder 610. The decoder 610 applies a decoding method corresponding to an encoding method applied by the encoder 502 of the base station 500, decodes the input encoded data, and outputs the data obtained from the decoding. The block error rate deriving part 612 monitors the decoding of the decoder 610, derives a data error rate per a block which is a predetermined transmission unit (referred to as a 'block error rate', hereinafter), and outputs the same to the transmission parameter determination part 614.

Based on the block error rate, the transmission parameter determination part 614 determines the coding rate and the modulation method which are the transmission parameters. Specifically, the transmission parameter determination part 614 determines that a propagation environment of the downlink radio channel is bad in a case where the block error rate is high, that is, the data error rate is high, and, changes the coding rate to a smaller one, or changes the modulation method into one applying larger transmission energy per bit. On the other hand, the transmission parameter determination part 614 determines that the propagation environment of the downlink radio channel is good in a case where the block error rate is low, that is, the data error rate is low, and, changes the coding rate to a larger one, or changes the modulation method into one applying smaller transmission energy per bit. Further, the transmission parameter determination part 614 outputs information concerning the new transmission parameters to the transmission baseband part 616.

The transmission baseband part 616 encodes the information concerning the new transmission parameters, and further, modulates a baseband signal of an uplink direction toward the base station 500 (referred to as an 'uplink baseband signal', hereinafter) by the information concerning the new transmission parameters, and outputs the same to the transmission part 618. The transmission part 618 outputs the input signal to the base station 500 via the circulator 604 and the antenna 602.

The reception part 508 of the base station 500 receives the signal from the mobile station 600 via the antenna 510 and the circulator 508, and outputs the same to the demodulation part 514. The demodulator 514 demodulates the input signal, and outputs the encoded data to the decoder 516. The decoder 516 decodes the input encoded data, and outputs the information concerning the transmission parameters obtained from the decoding, to the transmission parameter setting part 518.

The transmission parameter setting part 518 recognizes the new coding rate and modulation method based on the input information concerning the transmission parameters. Further, the transmission parameter setting part 518 notifies the encoder 502 of the coding rate, and notifies the modulation part 504 of the modulation method. In data transmission carried out after that from the base station 500 toward the mobile station 600, the encoder 502 applies the new coding rate, and the modulation part 504 applies the new modulation method.

As to the prior arts relating to the above-described transmission parameters, see the following patent documents 1 through 4, for example:
  (Patent Document 1)
Japanese Laid-open Patent Application No. 2001-238256;
  (Patent Document 2)
Japanese Laid-open Patent Application No. 2001-339458;

(Patent Document 3)
Japanese Laid-open Patent Application No. 2002-84578; and
(Patent Document 4)
Japanese Laid-open Patent Application No. 11-88940.

However, in the above-described method of changing the transmission parameters, a time is required for deriving the block error rate by means of the block error rate deriving part 612. Thereby, the base station 500 cannot change the transmission parameters rapidly in response to a fluctuation of the propagation environment of the downlink radio channel.

DISCLOSURE OF THE INVENTION

An object of the present invention is to provide a radio channel control method and a receiving apparatus solving the above-mentioned problem, by which it is possible to rapidly respond to a fluctuation of a propagation environment of a radio channel.

In order to achieve this object, in a mobile communication system having a transmitting apparatus and a receiving apparatus according to the present invention, in a radio channel control method for controlling a radio channel from the transmitting apparatus toward the receiving apparatus, the receiving apparatus generates transmission power control information for controlling transmission power of the radio channel according to a propagation environment of the radio channel; generates information concerning a transmission parameter based on the transmission power control information; and notifies the transmitting apparatus of the information concerning the transmission parameter; and the transmitting apparatus controls the radio channel based on the information concerning the transmission parameter received from the receiving apparatus.

By this radio channel control method, the receiving apparatus generates the information concerning the transmission parameter based on the transmission power control information for controlling the transmission power of the radio channel. Thus, unlike the prior art, it is not necessary to use the block error rate for generating the information concerning the transmission parameter. Thereby, the transmitting apparatus can change the transmission parameter rapidly in response to a fluctuation of the propagation environment of the radio channel.

BRIEF DESCRIPTION OF DRAWINGS

Other objects, features and advantages of the present invention will become more apparent from reading the following detailed description with reference to accompanying documents.

FIG. 3 shows a correspondence relationship between transmission parameters and transmission parameter concerned information;

BEST MODE FOR CARRYING OUT THE PRESENT INVENTION

Embodiments of the present invention are described below with reference to figures.

Figure 1:
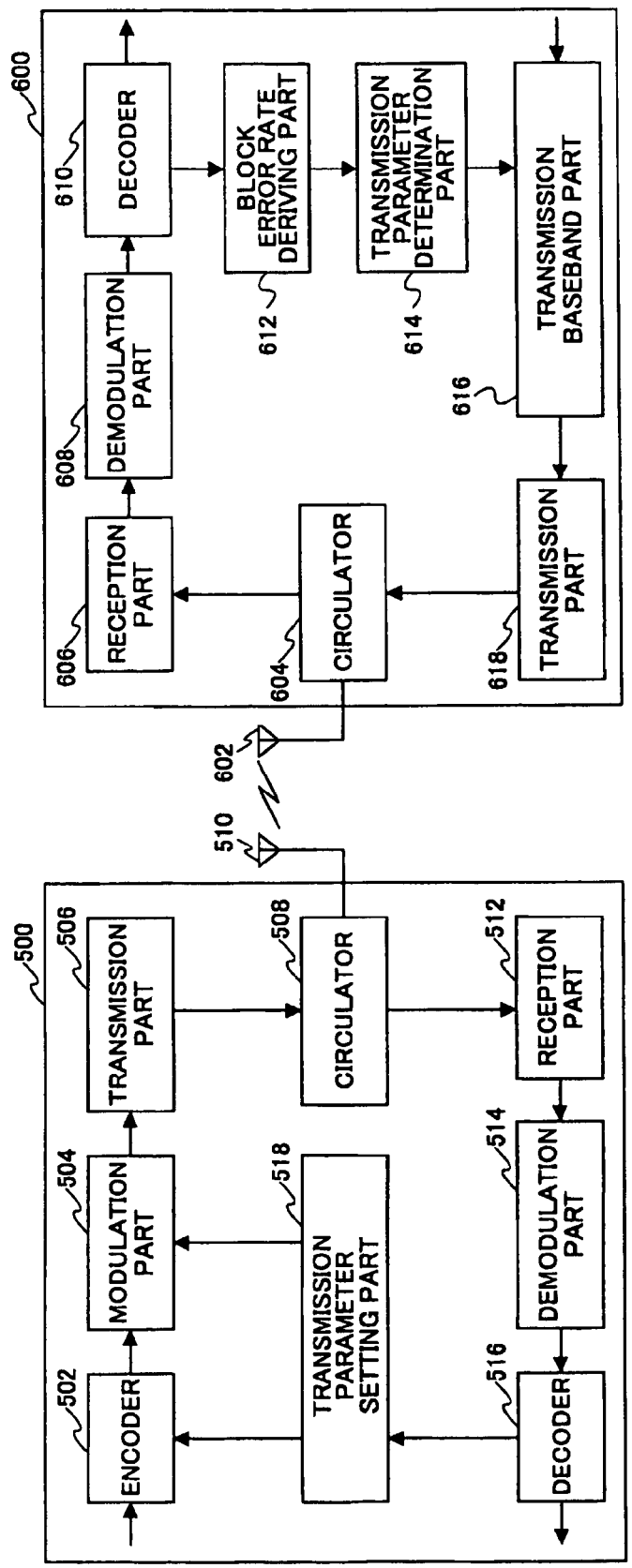
FIG. 1 shows a configuration example of a mobile communication system in the prior art.
Figure 2:
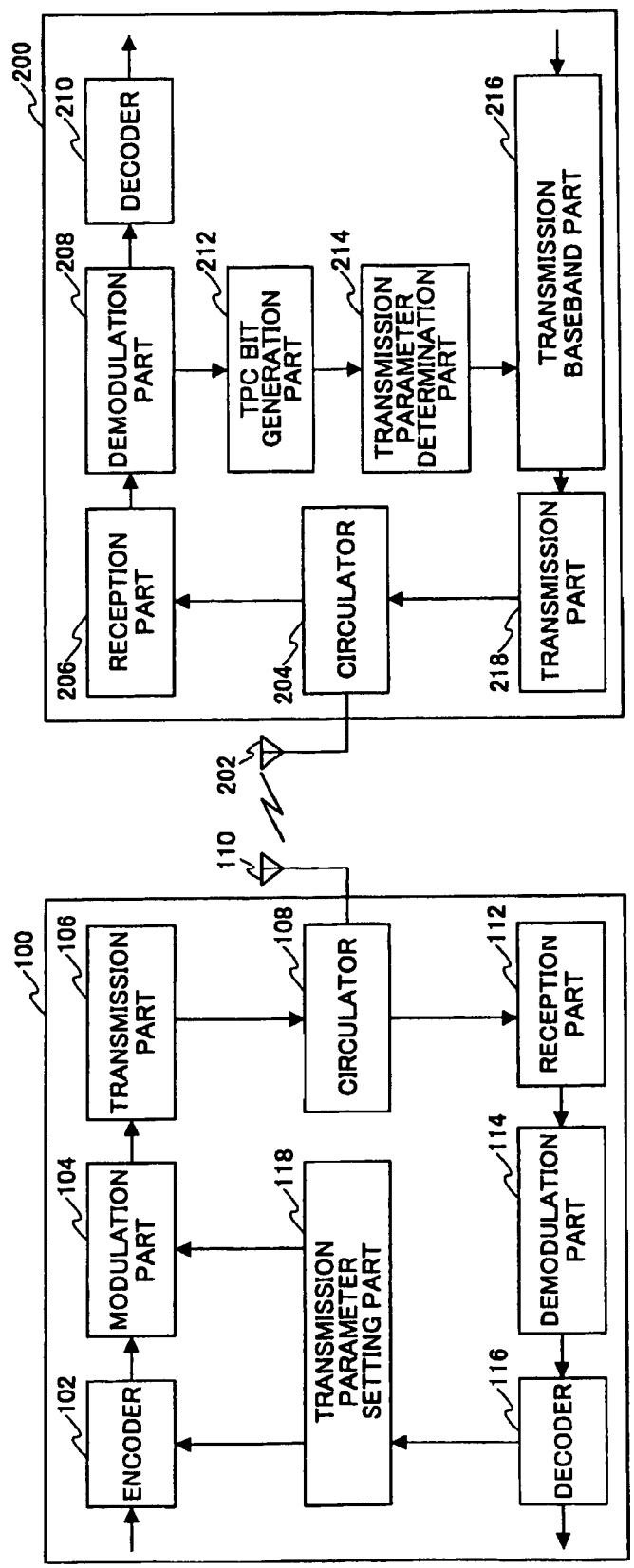
FIG. 2 shows a configuration example of a mobile communication system in a first embodiment of the present invention.

FIG. 2 shows a configuration example of a mobile communication system according to a first embodiment of the present invention. The mobile communication system shown in FIG. 2 includes a base station 100 acting as a transmitting apparatus and a mobile station 200 acting as a receiving station. This mobile communication system appropriately changes transmission parameters in response to a fluctuation of a propagation environment of a radio channel (downlink radio channel) toward the mobile station 200 from the base station 100. Hereinafter, it is assumed that, as the transmission parameters, a coding rate and a modulation method are applied.

The base station 100 includes an encoder 102, a modulation part 104, a transmission part 106, a circulator 108, an antenna 110, a reception part 112, a demodulation part 114, a decoder 116 and a transmission parameter setting part 118. The mobile station 200 includes an antenna 202, a circulator 204, a reception part 206, a demodulation part 208, a decoder 210, a TPC bit generation part 212, a transmission parameter determination part 214, a transmission baseband part 216 and a transmission part 218.

Change of the transmission parameters of the downlink radio channel from the base station 100 toward the mobile station 200 is carried out by the following procedures. That is, based on the coding rate which is the transmission parameter notified of from the transmission parameter setting part 118, the encoder 102 of the base station 100 encodes input data to be transmitted. Further, the encoder 102 outputs the encoded data obtained from the encoding to the modulation part 104. The modulation part 104 demodulates a base band signal with the encoded data based on the modulation method notified of by the transmission parameter setting part 118, and outputs it to the transmission part 106.

The transmission part 106 outputs a signal modulated with the encoded data as a signal to be transmitted to the circulator 108. The circulator 108 transmits the signal from the transmission part 106, via the antenna 110 at predetermined periods, while it outputs a signal received via the antenna 110 to the receiving part 112. The circulator 108 transmits the signal to be transmitted, toward the mobile station 200 at predetermined timing, in this case.

The same as the Circulator 108 of the base station 100, the circulator 204 of the mobile station 200 transmits a signal from the transmission part 218, at predetermined periods via the antenna 202, while it outputs a signal received via the antenna 202, to the reception part 206. The circulator 204 in this case outputs the signal which the antenna 202 receives from the base station 100, to the reception part 206.

The demodulation part 208 applies a demodulation method corresponding to the modulation method applied by the modulation part 104 of the base station 100, and demodulates the input signal. Further, the demodulation part 208 outputs the thus-obtained encoded data to the decoder 210. The decoder 210 applies a decoding method corresponding to the encoding method applied by the encoder 102 of the base station 100, decodes the input encoded data, and outputs data obtained from the decoding.

Further, the demodulation part 208 measures a signal-to-noise' power ratio (referred to as an 'SIR', hereinafter) of the downlink radio channel based on the input signal, and outputs the thus-obtained SIR to the TPC bit generation part 212.

The TPC bit generation part 212 compares the input SIR with a predetermined reference value, and, based on the comparison result, generates a bit (referred to as a 'TPC bit', hereinafter) for ordering the base station 100 to increase or decrease of transmission power of the downlink radio channel. Specifically, the TPC bit generation part 212 generates the TPC bit '0' for ordering the base station 100 to increase the transmission power in a case where th SIR is less than the reference value since the propagation environment of the downlink radio channel is bad, while, the TPC bit generation part 212 generates the TPC bit '1' for ordering the base station 100 to decrease the transmission power in a case where the SIR is equal to or higher than the reference value since the propagation environment of the downlink radio channel is good. Further, the TPC bit generation part 212 outputs the generated TPC bit to the transmission parameter determination part 214.

The downlink radio channel for which the signal-to-noise power ratio is measured and also for which the transmission power control is carried out may be a radio channel other than the downlink radio channel for which the transmission parameter control is carried out. For example, in a mobile communication system applying W-CDMA (Wideband Code Division Multiple Access), a DPCH (Dedicated Physical Channel) may be determined as the downlink radio channel for which the signal-to-noise power ratio measurement is carried out and for which the transmission power control is carried out, while a HS-DPCH (High-Speed Dedicated Physical Channel) may be determined as the downlink radio channel for the which transmission parameter control is carried out.

The transmission parameter determination part 214 determines the coding ratio and the modulation method which are the transmission parameters, based on the input TPC bit. FIG. 3 shows a relationship between transmission parameter values and the transmission parameters (modulation method and coding rate). In FIG. 3, as the transmission parameter value increases, the transmission parameters corresponding thereto become those by which a communication quality can be ensured even for a case where the propagation environment is bad.

When the input TPC bit is '0', that is, for a case where the propagation environment of the downlink radio channel is bad and the transmission power of the downlink radio channel is to be increased, the transmission parameter determination part 214 increases the transmission parameter value corresponding to the transmission parameters currently applied by the base station 100 so as to change the coding rate into a smaller one or change the modulation method into one which applies larger energy per bit, and determines the transmission parameters corresponding to the thus-increased transmission parameter value as new transmission parameters. On the other hand, when the input TPC bit is '1', that is, for a case where, the propagation environment of the downlink radio channel is good and the transmission power of the downlink radio channel is to be lowered, the transmission parameter determination part 214 decreases the transmission parameter value corresponding to the transmission parameters currently applied by the base station 100 so as to change the coding rate into a larger one or change the modulation method into one which applies smaller energy per bit, and determines the transmission parameters corresponding to the thus-lowered transmission parameter value as new transmission parameters.

For example, it is assumed that the modulation method currently applied by the base station 100 is QPSK and the coding rate is ¾. In this case, the transmission parameter value '2' corresponds to these transmission parameters according to FIG. 3. The transmission parameter determination part 214 increases the transmission parameter value by 1 into '3' when the input TPC bit is '0', and determines the transmission parameters (the modulation method is 16QAM, and the coding rate is ½) corresponding to the transmission parameter value '3' as new transmission parameters. On the other hand, the transmission parameter determination part 214 decreases the transmission parameter value by 1 into '1' when the input TPC bit is '1', and determines the transmission parameters (the modulation method is QPSK, and the coding rate is ½) corresponding to the transmission parameter value '1' as new transmission parameters. The transmission parameter determination part 214 outputs the transmission prater value corresponding to the new transmission parameters to the transmission baseband determination part 216.

The transmission baseband part 216 encodes the transmission parameter value, modulates the baseband signal toward the base station 200 by the thus-encoded transmission parameter value, and outputs it to the transmission part 218. The transmission part 218 then outputs the input signal to the circulator 204. The circulator 204 transmits the signal to be transmitted, at predetermined timing to the base station 100 via the antenna 202.

The circulator 108 of the base station 100 outputs the signal received from the mobile station 200 via the antenna 110 to the reception part 112. The reception part 112 outputs this signal to the demodulation part 114. The demodulation part 114 demodulates the input signal, and outputs the encoded data to the decoder 116. The decoder 116 decodes the input encoded data, and outputs the transmission parameter value thus obtained from the decoding to the transmission parameter setting part 118.

The transmission parameter setting part 118 recognizes the new coding rate and modulation method based on the input transmission parameter value and the correspondence relationship shown in FIG. 3 between the transmission parameter value and the transmission parameters. Further, the transmission parameter setting part 118 notifies the encoder 102 of the coding rate and notifies the modulation part 104 of the modulation method. In data transmission from the base station 100 to the mobile station 200 after that, the encoder 102 applies the new coding rate and the modulation part 104 applies the new modulation method.

In the above-described first embodiment, the mobile station 200 generates the new transmission parameter value based on the TPC bit controlling the downlink radio channel transmission power, and does not need to apply the block error rate as in the prior art. Thereby, the base station can change the transmission parameters rapidly in response to a fluctuation of the downlink radio change propagation environment.

Figure 4:
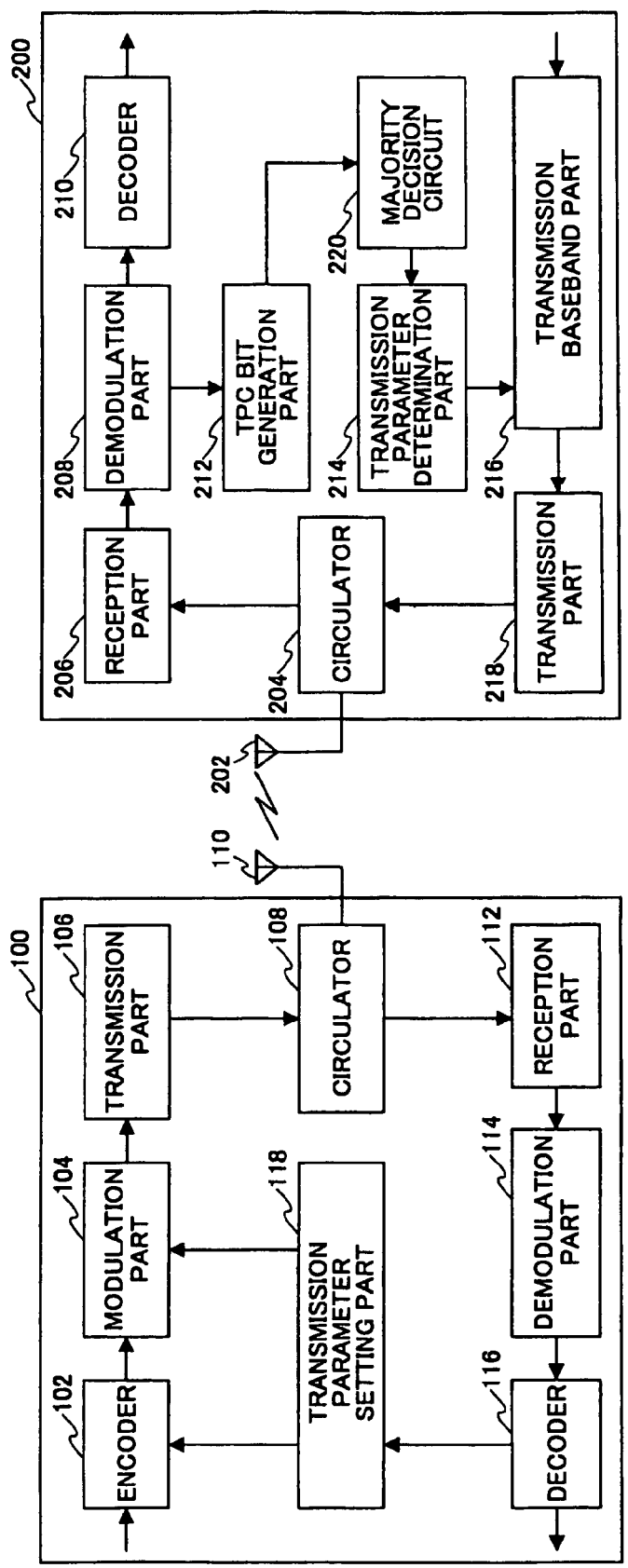
FIG. 4 shows a configuration example of a mobile communication system in a second, embodiment of the present invention.

FIG. 4 shows a configuration example of a mobile communication system according to a second embodiment of the present invention. In comparison to the mobile communication system shown in FIG. 2, the mobile station of the mobile communication system shown in FIG. 4 additionally includes a majority decision circuit 220 between the TPC bit generation part 212 and the transmission parameter determination part 214.

The majority decision circuit 220 determines whether '0' or '1' occurs more in the plurality of TPC bits input from the TPC bit generation part 212 during a first predetermined period. Further, the majority decision circuit 220 outputs the TPC bit, which is one occurring more, to the transmission parameter determination part 214. The transmission parameter determination part 214 determines the coding rate and the modulation method which are the transmission parameters, in the same procedures as those in the first embodiment based on the input TPC bit.

It is noted that the majority decision circuit 220 may output, in addition to the TPC bit which is one occurring more, a difference between the number of the TPC bits, which are ones occurring more, and the number of the TPC bits, which are ones occurring less, to the transmission parameter determination part 214. In this case, the transmission Parameter determination part 214 increases a changing amount of the transmission parameter value corresponding to the transmission parameters currently applied by the base station 100, as the difference becomes larger, and determines the transmission parameters corresponding to the transmission parameter value, thus changed by the increased changing amount.

In the second embodiment described above, it is possible to reduce a frequency of transmitting the transmission parameter value to the base station 100, in comparison to the case of the first embodiment. Accordingly, it is possible to widen a band available for transmitting information other than the transmission parameter in the uplink radio channel from the mobile station 200 toward the base station 100.

Figure 5:
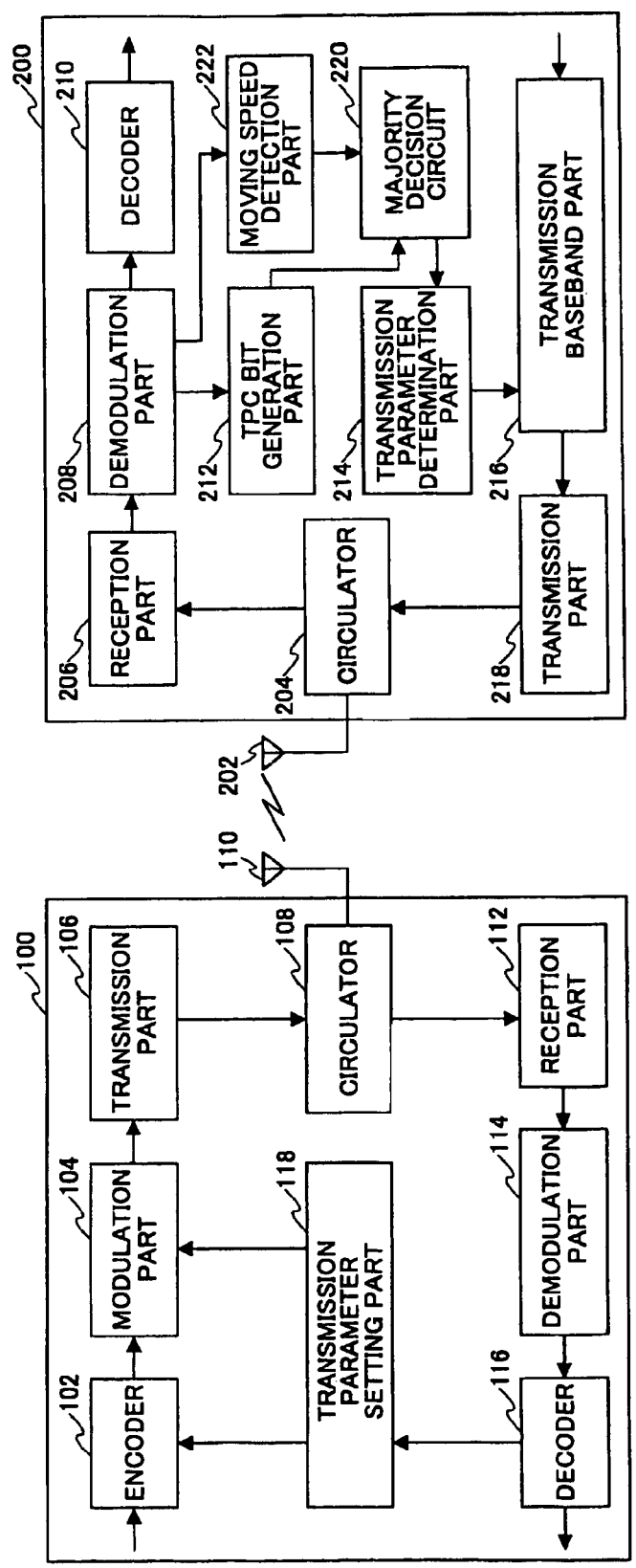
FIG. 5 shows a configuration example of a mobile communication system in a third embodiment of the present invention.

FIG. 5 shows a configuration example of a mobile communication system according to a third embodiment of the present invention. In the mobile communication system shown in FIG. 5, the mobile station 200 newly includes a moving speed detection part 222 between the demodulation part 208 and the majority decision circuit 220, in comparison to the mobile communication system shown in FIG. 4.

The moving speed detection part 222 detects a moving speed of the mobile station 200 based on a fluctuation of receiving power of a signal input to the demodulation part 208. As a specific method of detecting the moving speed, for example, see Japanese Laid-open Patent Application No. 6-514586. The moving speed detection part 222 should not necessarily apply the signal input to the demotion part 208 to detect the moving speed of the mobile station 200. For example, any other method, by which the moving speed of the mobile station 200 may be detected, may be applied. For example, a function of a GPS (Global Positioning System) or such may be applied. The moving speed detection part 222 outputs the thus-detected moving speed of the mobile station 200, to the majority decision circuit 220.

The same as in the second embodiment, the majority decision circuit 220 determines which occurs more between '0' or '1' in the plurality of TPC bits input from the TPC bit generation part 212 during the first predetermined period. However, when the moving speed of the mobile station 200 is equal to or more than a predetermined value, since there is a high possibility that the propagation environment of the downlink radio channel changes for a large amount during a short period, the majority decision circuit 220 shortens the first predetermined period. Further, when the moving speed of the mobile station 200 is less than the predetermined value, since there is a low possibility that the propagation environment of the downlink radio channel changes for a large amount during a short period, the majority decision circuit 220 elongates the first predetermined period.

According to the third embodiment described above, the mobile station 200 can increase the frequency of transmitting the transmission parameter value when the moving speed of the mobile station 200 is high and there is a high possibility that the propagation environment of the downlink radio channel changes for a large amount during a short period, while it can reduce the frequency of transmitting the transmission parameter value when the moving speed of the mobile station 200 is low and there is a low possibility that the propagation environment of the downlink radio channel changes for a large amount during a short period. Thereby, the mobile station 200 can transmit the transmission parameter value with a suitable frequency in response to the propagation environment of the downlink radio channel.

Figure 6:
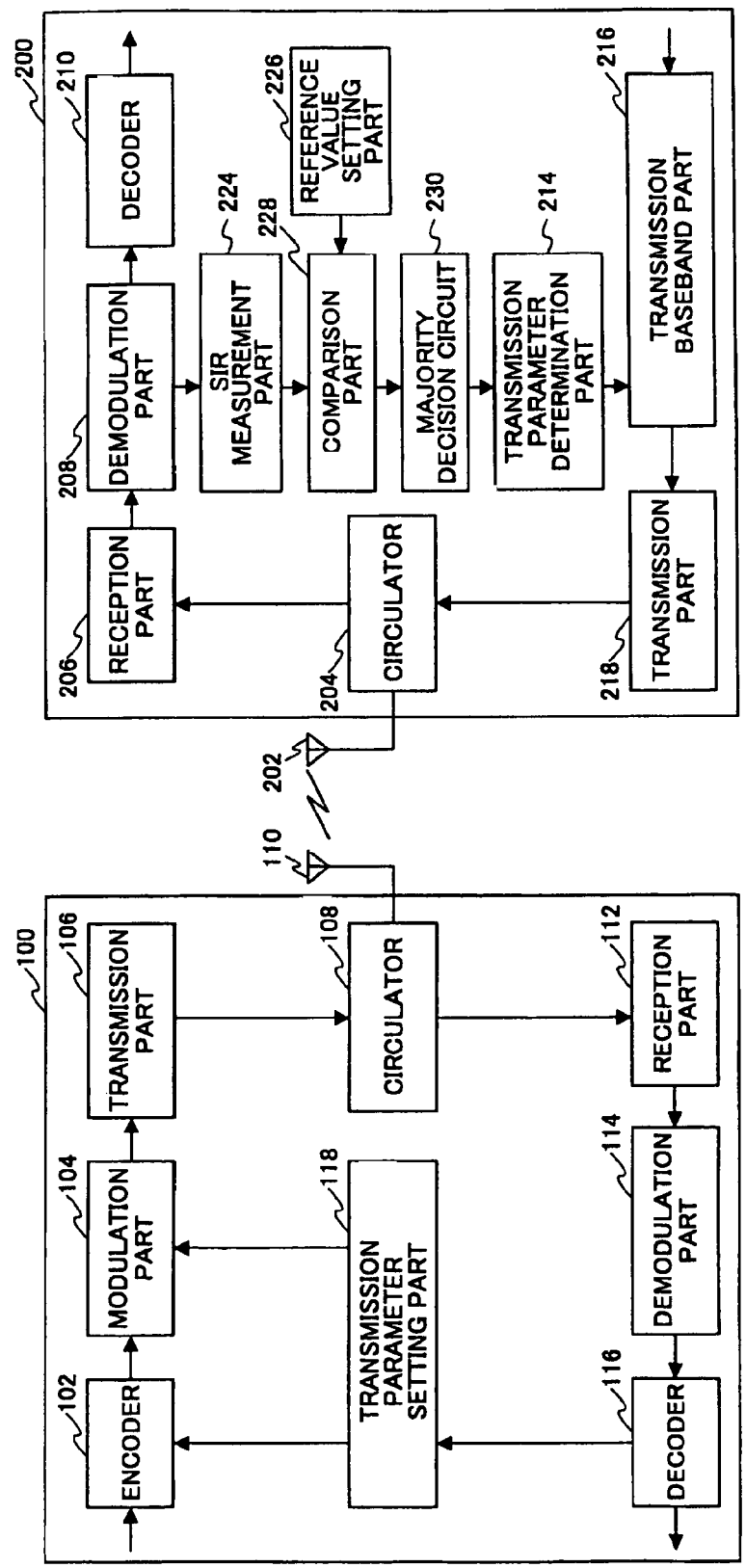
FIG. 6 shows a configuration example of a mobile communication system in a fourth embodiment of the present invention.

FIG. 6 shows a configuration example of a mobile communication system according to a fourth embodiment of the present invention. In the mobile communication system shown in FIG. 6, the mobile station 200 does not includes the TPC bit generation part 212 between the demodulation part 208 and the transmission parameter determination part 213, while newly including a SIR measurement part 224, a reference value setting part 226, a comparison part 228 and a majority decision circuit 230, in comparison to the mobile communication system shown in FIG. 2.

According to this fourth embodiment, the demodulation part 208 of the mobile station 200 outputs the input signal to the SIR measurement part 224. The SIR measurement part 224 measures a signal-to-noise power ratio in the downlink radio channel based on the input signal, and outputs the thus-obtained SIR to the comparison part 228.

In the reference value setting part 226, a reference value of the SIR is set. The comparison part 228 compares the SIR measured by the SIR measurement part 224 (referred to as a 'SIR measurement value' hereinafter) and the SIR reference value set in the reference value setting part 226, and outputs a result thereof to the majority decision circuit 230.

The majority decision part 230 determines, as to the comparison results input from the comparison part 228 during a second predetermined period, which occurs more between the comparison result indicating that the SIR measurement value is more than the SIR reference value and the comparison result indicating that the SIR measurement value is less than the SIR reference value. The majority decision circuit 230 outputs the comparison result which is one occurring more to the transmission parameter determination part 214.

The transmission parameter determination part 214 determines the coding rate and the modulation method which are the transmission parameters based on the input comparison result. Specifically, when the input comparison result indicates that the SIR measurement value is more than the SIR reference value, the transmission parameter determination part 214 changes the coding rate to a larger one or changes the modulation method to one applying smaller transmission energy per bit. On the other hand, when the input comparison result indicates that the SIR measurement value is less than the SIR reference value, the transmission parameter determination part 214 changes the coding rate to a smaller one or changes the modulation method to one applying larger transmission energy per bit.

The majority decision circuit 230 may output, in addition to the comparison result which is one occurring more, a difference between the comparison results which are one occurring more and the comparison results which are one occurring less, to the transmission parameter determination part 214. In this case, assuming that the relationship between the transmission parameter values and the transmission parameters is that shown in FIG. 3, the transmission parameter determination part 214 increases a changing amount of the transmission parameter value corresponding to the transmission parameters currently applied by the base station 100 as the difference is larger, and then determines the transmission parameters corresponding to the thus-changed transmission parameter value as new transmission parameters.

In the above-described fourth embodiment, the mobile station 200 generates the new transmission parameters based on the SIR of the downlink radio channel and does not need to apply the block error rate as in the prior art. Therefore the base station 100 can rapidly change the transmission parameters in response to a fluctuation of the propagation environment of the downlink radio channel.

Figure 7:
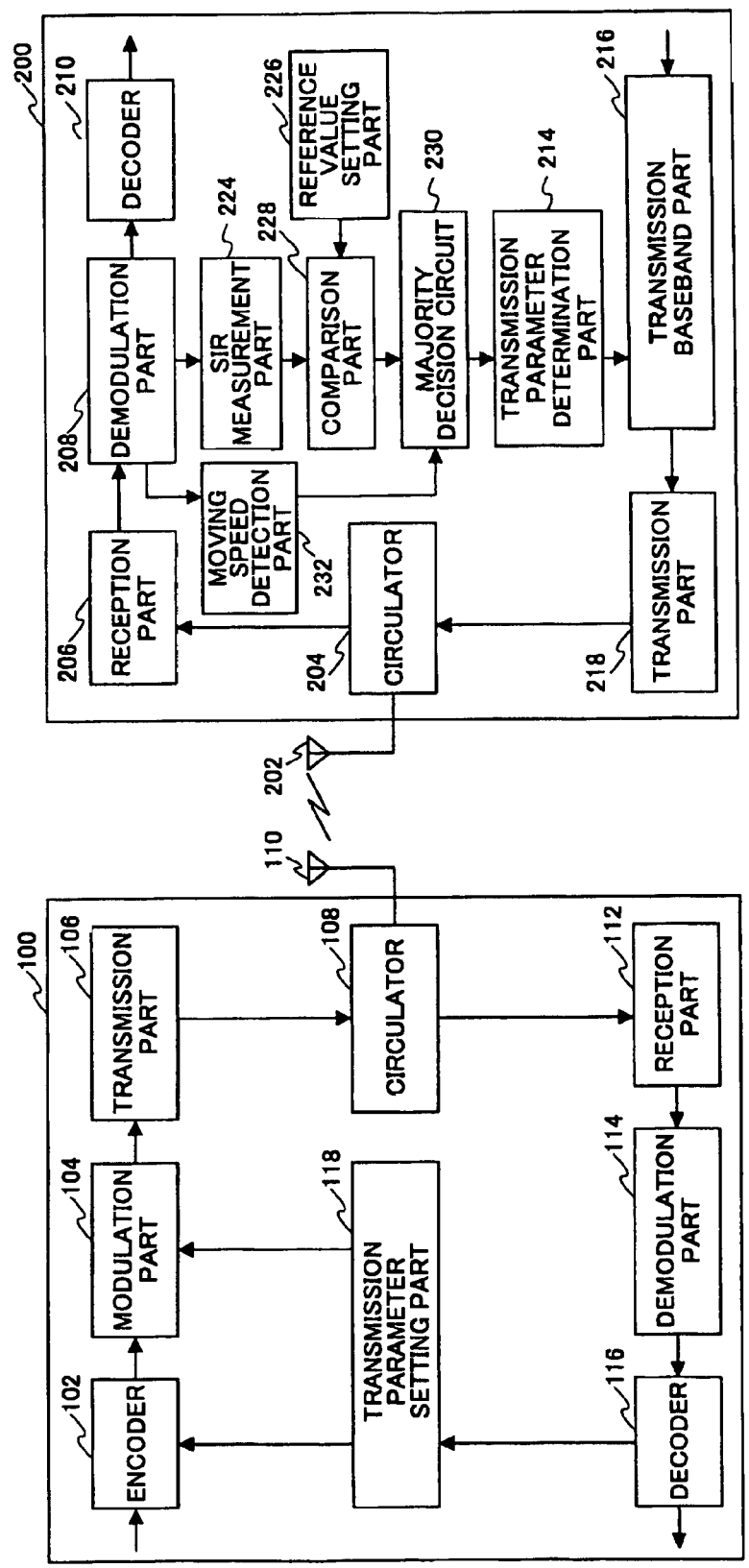
FIG. 7 shows a configuration example of a mobile communication system in a fifth embodiment of the present invention.

FIG. 7 shows a configuration example of a mobile communication system according to a fifth embodiment of the present invention. In the mobile communication system shown in FIG. 7, the mobile station 200 newly includes a moving speed detection part 232 between the demodulation part 208 and the majority decision circuit 230, in comparison to the mobile communication system shown in FIG. 6.

The same as the moving speed detection part 222 in the mobile station 200 shown in FIG. 5, the moving speed detection part 232 detects a moving speed of the mobile station 200 based on a fluctuation of the receiving power of the signal input to the demodulation part 208. The moving speed detection part 232 should detect the moving speed of the mobile station 200 with the use of any method, for example, a function of a GPS or such. The moving speed detection part 232 outputs the thus-detected moving speed of the mobile station 200 to the majority decision circuit 230.

The same as in the fourth embodiment, the majority decision circuit 230 determines, as to the comparison results input from the comparison part 228 during a second predetermined period, which is one occurring more between the comparison result indicating that the SIR measurement value is more than the SIR reference value and the comparison result indicating that the SIR measurement value is less than the SIR reference value. However, when the moving speed of the mobile station 200 is equal to or more than a predetermined value, since there is a high possibility that the propagation environment of the downlink radio channel changes for a large amount during a short period, the majority decision circuit 230 shortens the second predetermined period. Further, when the moving speed of the mobile station 200 is less than the predetermined value, since there is a low possibility that the propagation environment of the downlink radio channel changes for a large amount during a short period, the majority decision circuit 230 elongates the second predetermined period.

According to the fifth embodiment described above, the same as in the third embodiment, the mobile station 200 can increase the frequency of transmitting the transmission parameter value when the moving speed of the mobile station 200 is high and there is a high possibility that the propagation environment of the downlink radio channel changes for a large amount during a short period, while it can reduce the frequency of transmitting the transmission parameter value when the moving speed of the mobile station 200 is low and there is a low possibility that the propagation environment of the downlink radio channel changes for a large amount within a short period. Thereby, the mobile station 200 can transmit the transmission parameter value with a suitable frequency in response to a fluctuation of the propagation environment of the downlink radio channel.

Figure 8:
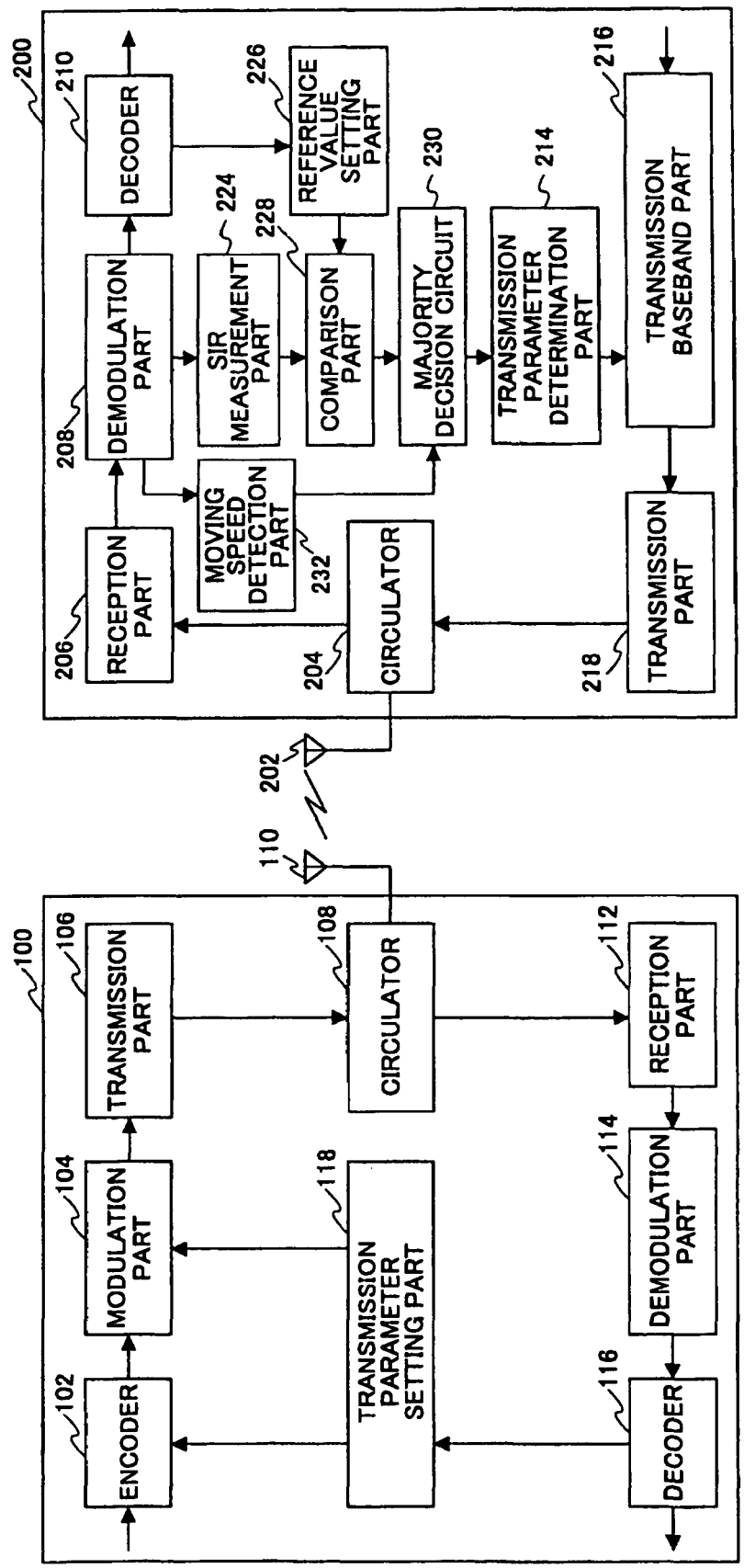
FIG. 8 shows a configuration example of a mobile communication system in a sixth embodiment of the present invention.

FIG. 8 shows a configuration example of a mobile communication system according to a sixth embodiment of the present invention. In the mobile communication system shown in FIG. 8, the decoder 210 and the reference value setting part 226 are connected with one another in the mobile station 200, in comparison to the mobile communication system shown in FIG. 7.

In the sixth embodiment, the decoder 210 applies a decoding method corresponding to the encoding method applied by the encoder 102 of the base station 100, decodes the input encoded data, and determines whether or not data reception is succeeded in. The decoder 210 outputs an ACK signal to the reference value setting part 226 when the data reception has been succeeded in. On the other hand, the decoder 210 outputs a NACK signal to the reference value setting part 226 when the data reception has been failed in.

When the ACK signal is successively input during a third predetermined period, the reference value setting part 226 lowers the SIR reference value. When the SIR reference value is thus lowered, a possibility that the comparison part 228 and the majority decision circuit 230 derive the comparison result indicating that the SIR measurement value is larger than the SIR reference value increases. Accordingly, a possibility that the transmission parameter determination part 214 changes the coding rate to a larger one or changes the transmission method into one applying smaller transmission energy per bit increases. Thus, it is possible to improve the transmission efficiency of the downlink radio channel in response to goodness in the propagation environment.

On the other hand, when the NACK signal is successively input during the third predetermined period, the reference value setting part 226 raises the SIR reference value. When the SIR reference value is thus raised, a possibility that the comparison part 228 and the majority decision circuit 230 derive the comparison result indicating that the SIR measurement value is less then the SIR reference value increases. Accordingly, a possibility that the transmission parameter determination part 214 changes the coding rate to a smaller one or changes the transmission method into one applying larger transmission energy per bit increases. Thus, it is possible to improve the transmission quality of the downlink radio channel in response to badness in the propagation environment.

Figure 9:
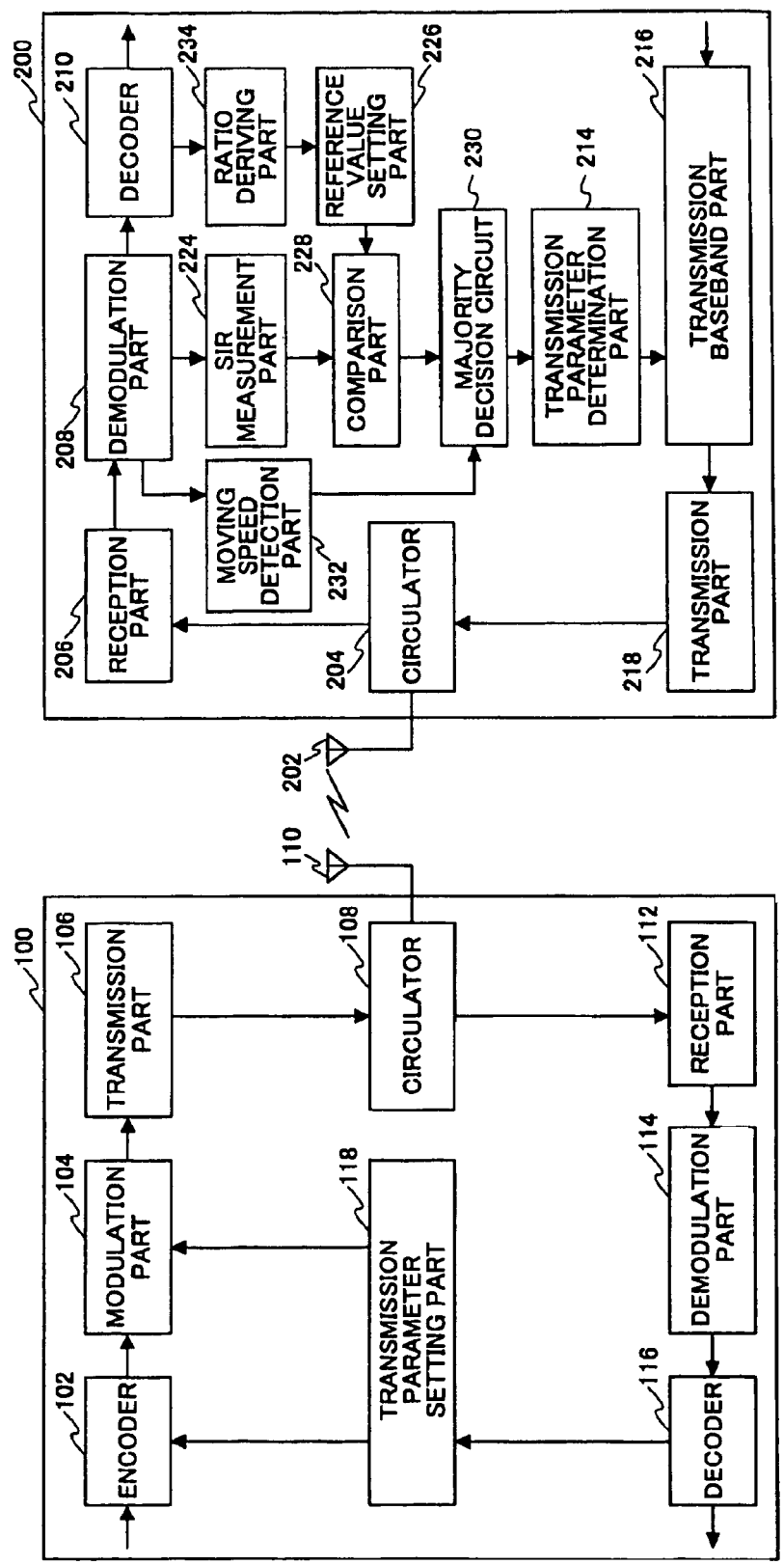
FIG. 9 shows a configuration example of a mobile communication system in a seventh embodiment of the present invention.

FIG. 9 shows a configuration example of a mobile communication system according to a seventh embodiment of the present invention. In the mobile communication system shown, in comparison to the mobile communication system shown in FIG. 8, a ratio deriving part 234 is newly included between the decoder 210 and the reference value setting part 226 in the mobile station 200.

In this seventh embodiment, the ratio deriving part 234 derives a ratio between the ACK signals and the NACK signals output from the decoder 210 during the third predetermined period, and outputs it to the reference value setting part 226.

When the ratio of the ACK signals is equal to or more than a predetermined value, or when the ratio of the NACK signals is less than a predetermined value, the reference value setting part 226 lowers the SIR reference value. When the SIR reference value is thus lowered, as in the sixth embodiment, a possibility that the transmission parameter determination part 214 changes the coding rate to a larger one or changes the transmission method into one applying smaller transmission energy per bit increases. Thus, it is possible to improve the transmission efficiency of the downlink radio channel.

On the other hand, when the ratio of the ACK signals is less than a predetermined value, or when the ratio of the NACK signals is equal to or more than a predetermined value, the reference value setting part 226 raises the SIR reference value. When the SIR reference value is thus raised, as in the sixth embodiment, a possibility that the transmission parameter determination part 214 changes the coding rate to a smaller one or changes the transmission method into one applying larger transmission energy per bit increases. Thus, it is possible to improve the transmission quality of the downlink radio channel.

Figure 10:
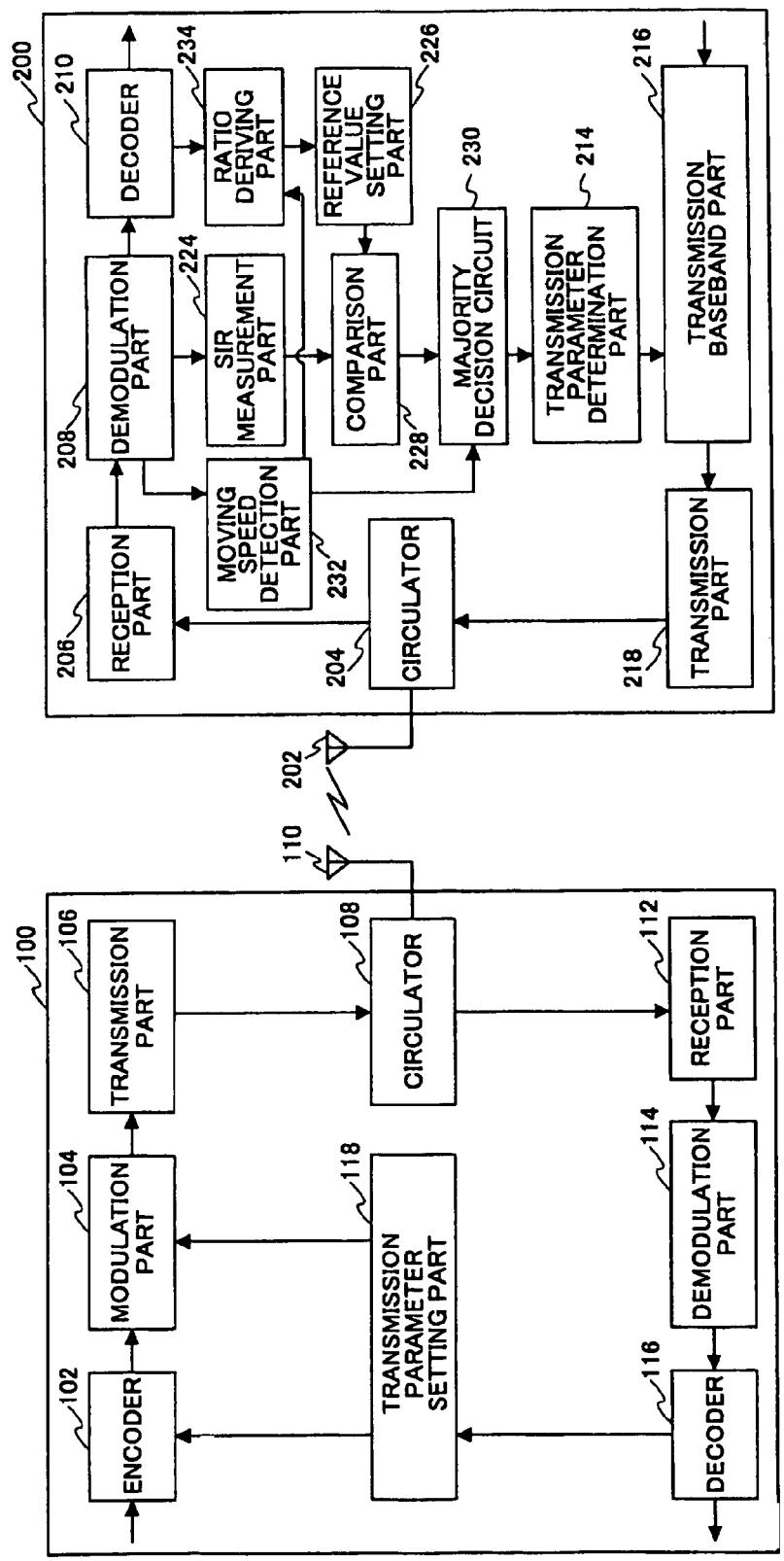
FIG. 10 shows a configuration example of a mobile communication system in an eighth embodiment of the present invention.

FIG. 10 shows a configuration example of a mobile communication system according to an eighth embodiment of the present invention. In the mobile communication system shown, in comparison to the mobile communication system shown in FIG. 9, the moving speed detection part 232 and the ratio deriving part 234 are connected with one another in the mobile station 200.

In this eighth embodiment, the same as in the seventh embodiment, the ratio deriving part 234 derives a ratio between the ACK signals and the NACK signals output by the decoder 210 during the third predetermined period, and outputs it to the reference value setting part 226. However, when the moving speed of the mobile station 200 is equal to or more than a predetermined value, since there is a high possibility that the propagation environment of the downlink radio channel changes for a large amount during a short period, the ratio deriving part 234 shortens the third predetermined period. Further, when the moving speed of the mobile station 200 is less than the predetermined value, since there is a low possibility that the propagation environment of the downlink radio channel changes for a large amount during a short period, the ratio deriving part 234 elongates the third predetermined period.

According to the eighth embodiment described above, the mobile station 200 can increase the frequency of transmitting the transmission parameter value when the moving speed of the mobile station 200 is high and there is a high possibility that the propagation environment of the downlink radio channel changes for a large amount during a short period, while it can reduce the frequency of transmitting the transmission parameter value when the moving speed of the mobile station 200 is low and there is a low possibility that the propagation environment of the downlink radio channel changes for a large amount during a short period. Thereby, the mobile station 200 can transmit the transmission parameter value with a suitable frequency in response to a fluctuation of the propagation environment of the downlink radio channel.

Figure 11:
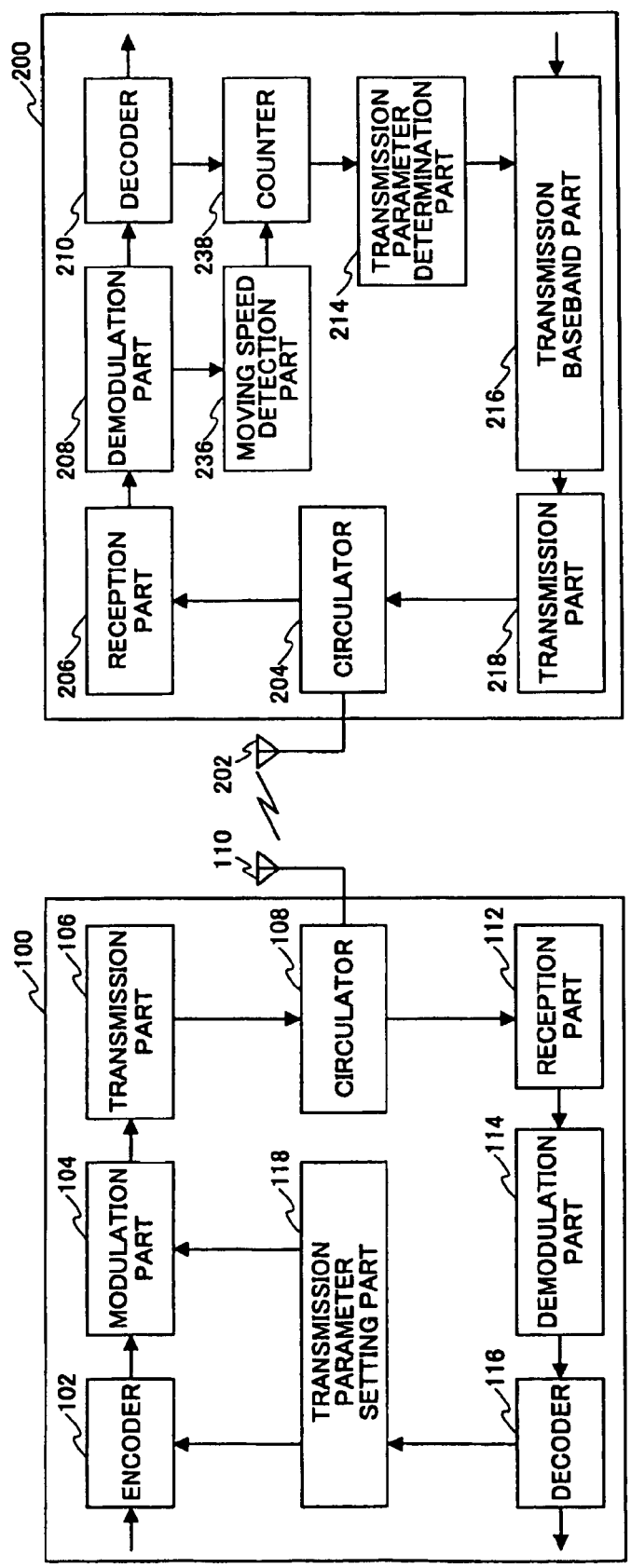
FIG. 11 shows a configuration example of a mobile communication system in a ninth embodiment of the present invention.

FIG. 11 shows a configuration example of a mobile communication system according to a ninth embodiment of the present invention. In the mobile communication system shown in FIG. 11, in comparison to the mobile communication system shown in FIG. 2, the TPC bit generation part 212 is not provided between the demodulation part 208 and the transmission parameter determination part 213, while a moving speed detection part 236 and a counter 238 are provided, in the mobile station 200. The counter 238 is connected with the decoder 210.

In this ninth embodiment, the decoder 210 in the mobile station 200 determines whether or nor data reception is succeeded in, as in the sixth embodiment. Further, the decoder 210 outputs an ACK signal to the reference value setting part 226 when data reception has been succeeded in. The decoder 210 outputs a NACK signal to the reference value setting part 226 when data reception has been failed in The counter 238 counts the number of ACK signals and NACK signals output from the decoder 210 during a fourth predetermined period, and outputs it to the transmission parameter determination part 214. However, when the moving speed of the mobile station 200 is equal to or more than a predetermined value, since there is a high possibility that the propagation environment of the downlink radio channel changes for a large amount during a short period, the counter 238 shortens the fourth predetermined period. Further, when the moving speed of the mobile station 200 is less than the predetermined value, since there is a low possibility that the propagation environment of the downlink radio channel changes for a large amount during a short period, the counter 238 elongates the fourth predetermined period.

The transmission parameter determination part 214 determines the coding rate and the modulation method which are the transmission parameters based on the input counter value. Specifically, when the ratio of the ACK signals is equal to or more than a predetermined value or the ratio of the NACK signals is less than a predetermined value, the transmission parameter determination part 214 changes the coding rate to a larger one or changes the modulation method to one applying smaller transmission energy per bit. On the other hand, when the ratio of the ACK signals is less than a predetermined value or the ratio of the NACK signals is equal to or more than a predetermined value, the transmission parameter determination part 214 changes the coding rate to a smaller one or changes the modulation method to one applying larger transmission energy per bit.

In the above-described ninth embodiment, the mobile station 200 generates the new transmission parameters based on whether or not data reception has been succeeded in, and does not need to apply the block error rate as in the prior art. Therefore the base station 100 can rapidly change the transmission parameters in response to a fluctuation of the propagation environment of the downlink radio channel.

Further, according to the ninth embodiment, the mobile station 200 can increase the frequency of transmitting the transmission parameter value when the moving speed of the mobile station 200 is high and there is a high possibility that the propagation environment of the downlink radio channel changes for a large amount during a short period, while it can reduce the frequency of transmitting the transmission parameter value when the moving speed of the mobile station 200 is low and there is a low possibility that the propagation environment of the downlink radio channel changes for a large amount during a short period. Thereby, the mobile station 200 can transmit the transmission parameter value with a suitable frequency in response to a fluctuation of the propagation environment of the downlink radio channel.

In the above-described embodiments, cased where the coding rate and the modulation method are applied as the transmission parameters have been described. However, the present invention can also be applied for a case where a Rate-Matching ratio, the number of spreading codes used in CDMA communication or such is applied as the transmission parameter. For example, the mobile station 200 lowers the Rate-Matching ratio when the propagation environment of the downlink radio channel is bad, while it raises the Rate-Matching ratio when the propagation environment of the downlink ratio channel is good. Or, the mobile station reduces the number of spreading codes when the propagation environment of the downlink radio channel is bad, while it increases the number of the spread codes when the propagation environment of the downlink radio channel is good.

Further, in the above-described embodiments, cases where the transmission parameters of the downlink radio channel are changed have been described. However, the present invention can also be applied for a case where transmission parameters of an uplink radio channel are changed. When the transmission parameters of the uplink radio channel are changed, the mobile station should have a configuration of the base station of the above-described embodiment, while the base station should have a configuration of the mobile station of the above-described embodiment.

The invention claimed is:

1. A transmitter used in a wireless communication system including the transmitter and a receiver, comprising: a transmitting unit that transmits a signal to the receiver; and a controlling unit that controls a rate matching rate for a radio channel from the transmitter toward the receiver based on information generated by the receiver; wherein the information indicates increment or decrement of reception quality at the receiver.

* * * * *